(12) United States Patent
Widdowson et al.

(10) Patent No.: US 7,609,847 B2
(45) Date of Patent: Oct. 27, 2009

(54) METHODS AND SYSTEMS FOR DETERMINING OBJECT LAYOUTS

(75) Inventors: Simon Widdowson, Dublin, CA (US); Xiaofan Un, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

(21) Appl. No.: 10/995,686

(22) Filed: Nov. 23, 2004

(65) Prior Publication Data

US 2006/0109510 A1 May 25, 2006

(51) Int. Cl.
 *G06K 9/00* (2006.01)
(52) U.S. Cl. .................. 382/100; 345/624; 345/625; 345/629; 345/632; 345/634
(58) Field of Classification Search .............. 382/173, 382/175, 176, 177, 180; 358/1.1, 1.18; 345/418, 345/467, 468, 469, 469.1, 619, 629–641
See application file for complete search history.

(56) References Cited

U.S. PATENT DOCUMENTS

| | | | | |
|---|---|---|---|---|
| 5,138,304 | A | * | 8/1992 | Bronson ................ 345/157 |
| 5,278,919 | A | * | 1/1994 | Sugiura et al. .......... 382/176 |
| 5,729,704 | A | * | 3/1998 | Stone et al. ............ 715/804 |
| 6,028,608 | A | * | 2/2000 | Jenkins ................. 345/619 |
| 6,161,114 | A | | 12/2000 | King et al. |
| 6,219,025 | B1 | * | 4/2001 | Hill et al. .............. 345/589 |
| 6,243,721 | B1 | | 6/2001 | Duane et al. |
| 6,320,595 | B1 | * | 11/2001 | Simons et al. .......... 345/619 |
| 6,711,291 | B1 | * | 3/2004 | Stubler et al. ........... 382/195 |
| 2001/0033284 | A1 | * | 10/2001 | Chan ..................... 345/441 |
| 2002/0122067 | A1 | | 9/2002 | Geigel et al. |
| 2002/0136455 | A1 | * | 9/2002 | Lin et al. ............... 382/173 |
| 2002/0191860 | A1 | | 12/2002 | Cheatle |
| 2003/0142068 | A1 | * | 7/2003 | DeLuca et al. .......... 345/156 |
| 2003/0218679 | A1 | * | 11/2003 | Castorina et al. ........ 348/272 |

OTHER PUBLICATIONS

Cardon, Alain, Thierry Calinho, Jean-Philippe Vacher "Genetic Algorithms Using Multi-Objectives in a Multi-Agent System" *Robotics and Autonomous Systems,* vol. 33, 2000, pp. 179-190.
Deb, Kalyanmoy "Evolutionary Algorithms for Multi-Criterion Optimization in Engineering Design," in Kaisa Miettinen, Marko M. Makela, Pekka Neittaanmaki, and Jacques Periaux, editors, *Evolutionary Algorithms in Engineering and Computer Science,* Chapter 8, pp. 135-161, John Wiley & Sons, Ltd, Chichester, UK 1999.
Lucas, Chris "Practical Multiobjective Optimisation" http://www.calresco.org/lucas/pmo.htm, Version 4.83, Apr. 2006, (Paper V1.1, Original Mar. 2002).
Johari, R., et al., "Automatic Yellow-Pages Pagination and Layout," Mitsubishi Electric Research Laboratory, www.merl.com, Oct. 1996, TR-96-29, pp. 1-29.
Rowley, H.A., et al., "Neural Network-Based Face Detection," IEEE, Pami, Jan. 1998, pp. 1-28.

* cited by examiner

*Primary Examiner*—Samir A. Ahmed
*Assistant Examiner*—Atiba O Fitzpatrick

(57) ABSTRACT

Systems and methods according to the present invention provide techniques to automatically generate an object layout. Various candidate placement positions are evaluated by computing values associated with placing the object at the placement positions. Cost functions associated with contrast, saliency and/or sharpness can be used to evaluate the desirability of each candidate placement position.

31 Claims, 7 Drawing Sheets

METHODS AND SYSTEMS FOR DETERMINING OBJECT LAYOUTS

BACKGROUND

The present invention relates generally to image processing systems and, more particularly, to methods and systems for determining object layouts in, e.g., materials to be printed.

Variable data printing (VDP) techniques have become more popular in recent years with the advent of digital press technologies which enable the printing of, for example, highly personalized marketing materials. One task associated with VDP applications is generating an object layout, e.g., selecting the positions and sizes of individual content elements on the pages to be printed. For example, as shown in FIG. 1, determining the size and position of the text string 100 within a background image 110 is a part of the object layout process.

Generating object layouts has traditionally been a manual operation. However, to continue the trend associated with automating image processing techniques generally, it would be desirable to provide systems and methods which automate generating object layouts as part of, for example, a VDP application. One technique for automating object layout generation is to use a single template which forces each object to be positioned and sized in a predetermined way. For example, referring again to FIG. 1, this object layout could be used as a template with the text string 100 being positioned at the same position shown relative to background image 110 for each printing run. While this approach may work well when the variable data being printed is constrained to be of a certain type, e.g., if text string 100 is constrained to be names and addresses, it lacks sufficient flexibility to more generically handle variable data printing tasks in which the number and types of objects, as well as the background, vary more significantly.

SUMMARY

Systems and methods according to the present invention provide techniques to automatically generate object layouts. According to an exemplary embodiment of the present invention, a method for image processing includes the steps of computing a value associated with positioning an object at each of a plurality of different positions relative to a background image, selecting one of the plurality of different positions based on computed values and positioning the object in the image at the selected one of the plurality of different positions.

According to another exemplary embodiment of the present invention, an image processing system includes a processor which computes a value associated with positioning an object at each of a plurality of different positions relative to a background image, selects one of the plurality of different positions based on computed values and positions the object in the image at the selected one of the plurality of different positions.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
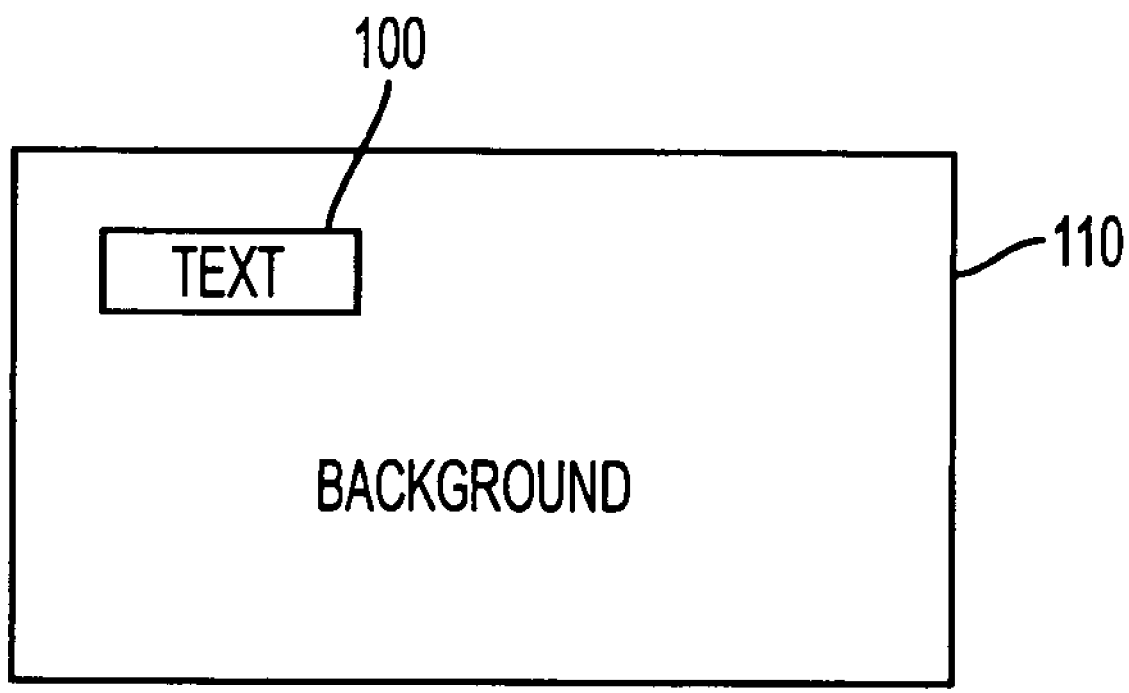
FIG. 1 shows an exemplary object layout.
Figure 2:
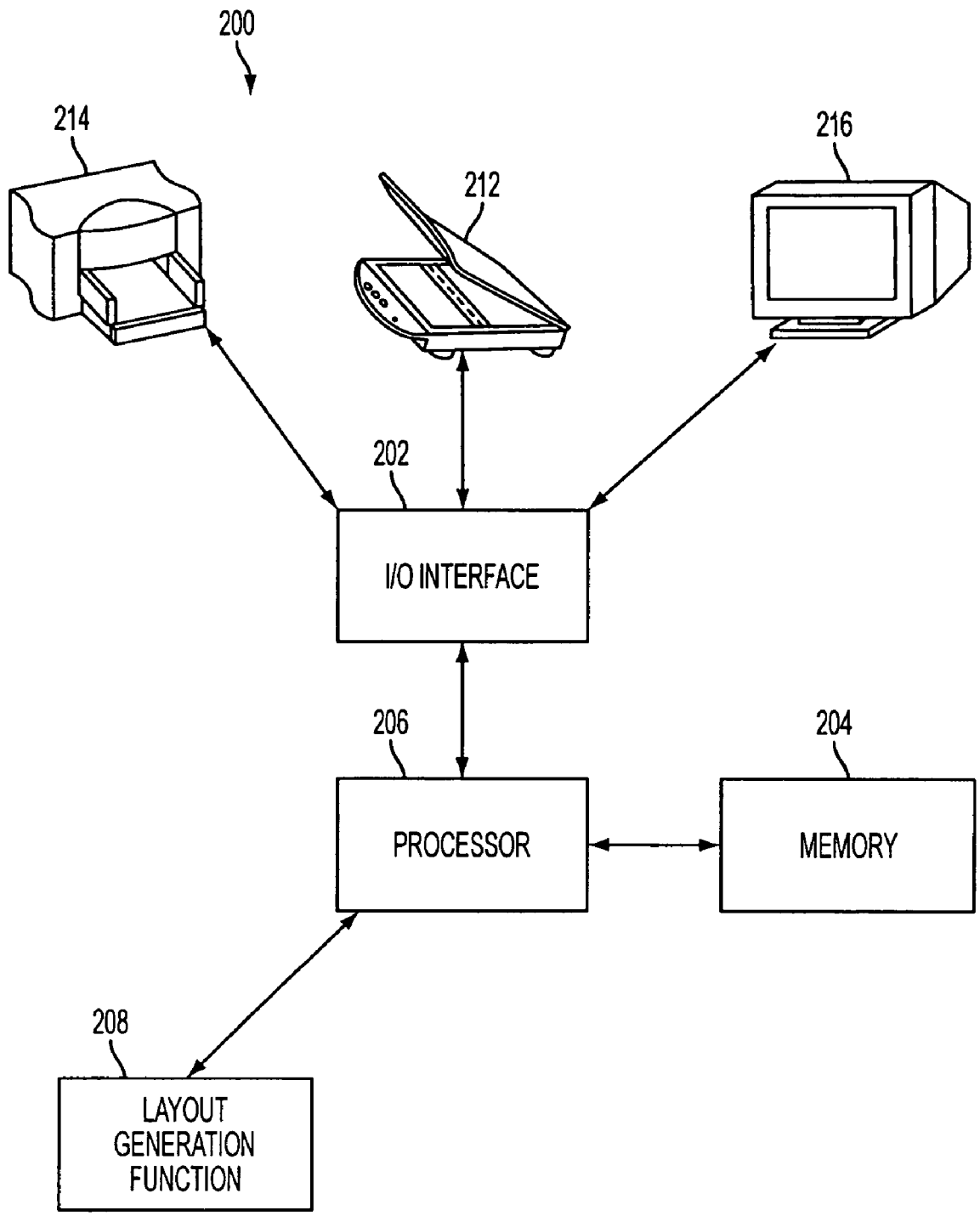
FIG. 2 depicts an image processing system according to an exemplary embodiment of the present invention.

In order to provide some context for this discussion, an image processing system according to an exemplary embodiment of the present invention will first be described with respect to FIG. 2. Therein, an image processing system 200 includes an I/O interface 202 and a memory device 204 that are connected to a processor 206. These components can be packaged together in, for example, a personal computer. The image processing system 200 further includes a layout generation function 208 which is run by processor 206. Although the components 202-208 are illustrated in FIG. 2 as separate components of the image processing system 200, two or more of these components may be integrated, thereby decreasing the number of components included in the image enhancing system. Additionally, the component 208 may be implemented in any combination of hardware, firmware and software. According to one exemplary embodiment, component 208 can be implemented as a software program(s) that performs the functions of the component 208, as described below, when executed by the processor 206. Scanner 212 is connected via I/O interface 202 to capture images for processing by image processing system 200. The I/O interface may be a USB port, a serial port or any other interface port that is designed to interface the scanner 212 to the image processing system 200. Alternatively, the I/O interface 202 may be a network interface to receive digital images from a local network (not shown) or from the Internet (not shown). Additionally, other devices, e.g., a digital camera (not shown), may be connected via I/O interface 202 to capture images for processing by image processing system 200. Printer 214 and monitor 216 are connected to the image processing system 200 via I/O interface 202 to provide output devices for, e.g., the processed image data.

Figure 3:
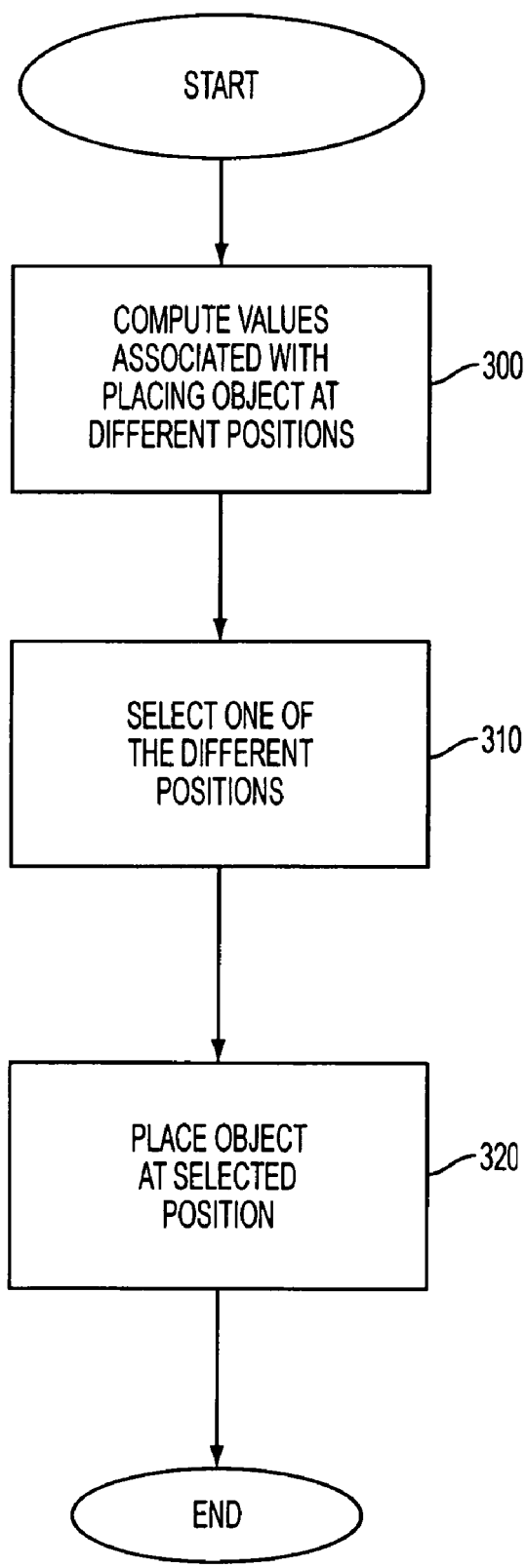
FIG. 3 is a flowchart depicting a method of generating an object layout according to an exemplary embodiment of the present invention.
Figure 4:
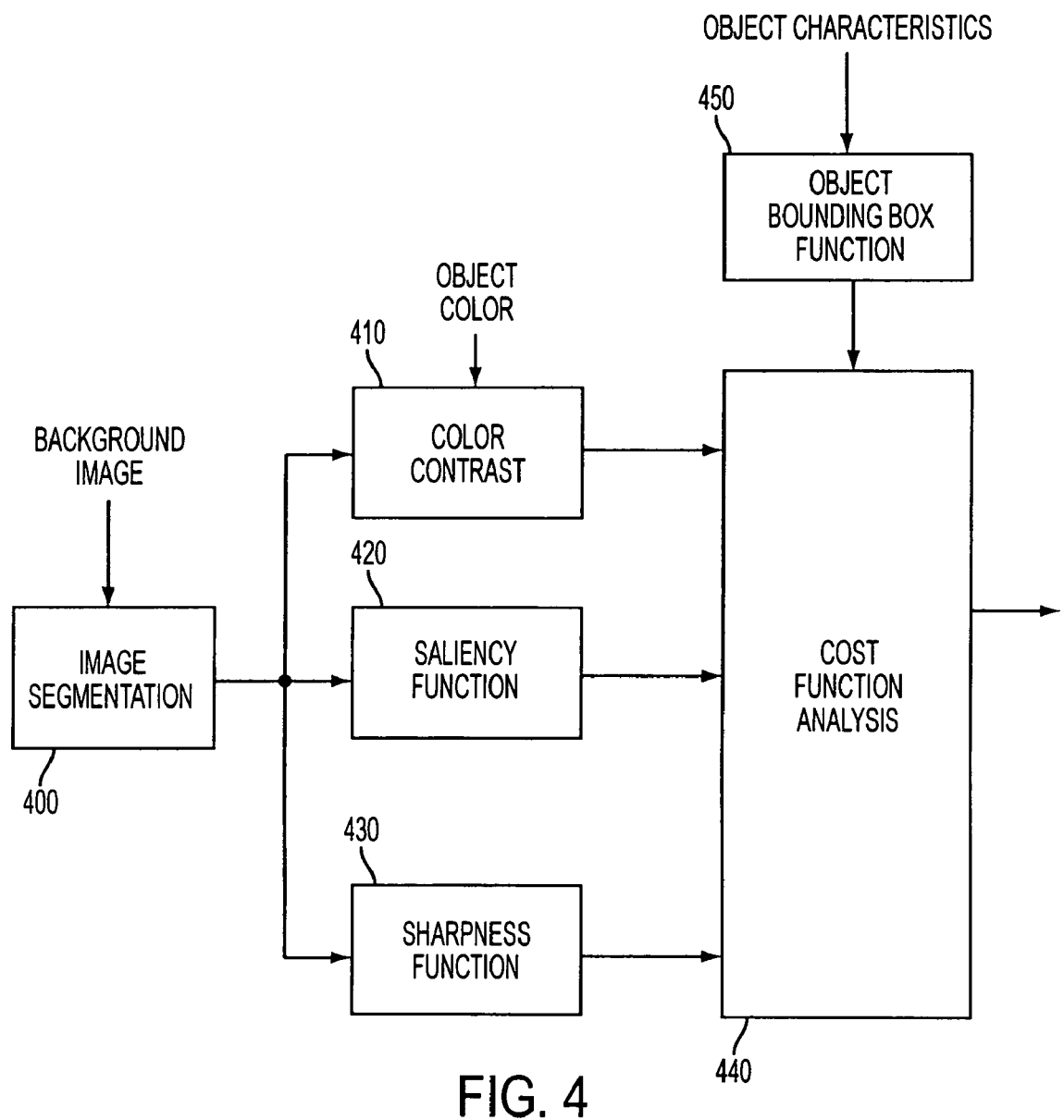
FIG. 4 is a flow diagram illustrating functions associated with an object layout generation mechanism according to an exemplary embodiment of the present invention.

According to exemplary embodiments of the present invention, methods and systems are provided which operate to automatically generate object layouts. For example, as shown by the flowchart of FIG. 3, a general method for processing an image according to a generalized exemplary embodiment of the present invention includes the steps of computing values associated with positioning an object at different positions (step 300), selecting one of the different positions based on the computed values (step 310) and placing the object at the selected position (320). Various different techniques are described herein for computing values which dictate object placement within a background image. A first exemplary embodiment will now be described with respect to FIG. 4.

Therein, the background image is segmented by image segmentation function 400. As used herein, the phrase "background image" refers to any type of container into which objects are to be laid out including, for example, an empty area. Image segmentation refers to the subdivision of an image into homogenous regions. Any image segmentation algorithm can be used in function 400 including, for example, that disclosed in U.S. Published Patent Application No. 20020191860 to Philip Stephen Cheatle, the disclosure of which is incorporated here by reference.

After the background image is segmented, each image segment is further analyzed by functions 410-430. Color contrast function 410 determines a color contrast between each image segment and the object to be placed within the background image. This can be accomplished by, for example, comparing the average segment color determined during image segmentation with the average color of the object to be inserted for each color component. Using red (R), green (G) and blue (B) components, the color contrast (CC) between the object to be inserted into the background image and each image segment can be calculated as:

$$CC_{segment} = \log(\Delta R + \Delta G + \Delta B) \quad (1)$$

where
ΔR=the difference between the average R value of the image segment and the average R value of the object;
ΔG=the difference between the average G value of the image segment and the average G value of the object; and
ΔB=the difference between the average B value of the image segment and the average B value of the object.

The saliency associated with each image segment is determined by saliency function 420. In this context, "saliency" refers to the relative importance of each image segment in comparison with the background image as a whole, i.e., to quantize the relative detriment associated with obscuring a particular image segment. Saliency function 420 can calculate a saliency score for each segment using any desired saliency criteria, e.g., size (smaller segments have higher saliency scores) and contrast with surrounding segments (higher contrast regions have higher saliency scores). An exemplary technique for determining saliency of image segments is provided in the above-incorporated by reference Published Patent Application. Additionally, the saliency function 420 can consider special features to have very high saliency values. For example, if the background image contains a person's face, the image segments associated with that face can be assigned a relatively high saliency value so as to avoid placing the object over the face in the background image. Thus, a face detection algorithm can be employed in saliency function 420 for this purpose. An example of a face detection algorithm is found an article authored by H. Rowley et al., entitled "Neural Network-Based Face Detection", IEEE PAMI, Volume 20, pp. 22-38, 1998, the disclosure of which is incorporated here by reference.

Additionally, at function 430, the sharpness of each image segment can be calculated. Sharpness can be calculated by, for example, using an autoregressive moving average (ARMA) filter which incorporates a high pass filter and low pass filter component and which is modified to score image segments having low sharpness more highly than areas of high sharpness, e.g., by ignoring low frequency components.

The color contrast, saliency and sharpness values associated with each image segment are passed to a cost function analysis unit 440. Also used as an input to cost function analysis unit 440 is a bounding box associated with the object to be placed within the background image. The bounding box can be determined by object bounding box function 450 based on characteristics associated with the object to be inserted, e.g., for a text object characteristics such as font size and string length. Using the bounding box, the cost function can be computed for each possible position at which the object can be placed within the background image. Then the object placement having the lowest (or highest) score can be selected as the placement position for the object.

An exemplary cost function based on contrast, saliency and sharpness can be expressed as:

$$Cost(x, y) = \sum \text{all segments}(sharpness^n * saliency^m * F_{segment}/constrast^k) \quad (2)$$

where:

(x,y) are the placement coordinates within the background image currently being evaluated as a candidate for placement of the object, $F_{segment}$ is the fraction of the segment obscured by the object when it is placed at position (x,y), contrast, saliency and sharpness are the values output from functions 410-430, respectively, for a particular image segment; and n, m and k are constants which can be used to vary a relative weighting between sharpness, saliency and contrast. According to one exemplary embodiment, n, m and k can be set equal to one to provide an even weighting between these variables, however those skilled in the art will appreciate that other values for n, m and k can be used. After all of the positions (x,y) at which a bounding box associated with the object could potentially fit within background image have been evaluated using cost function (2), then the position (x,y) having the minimal value can be selected for this exemplary embodiment.

Figure 5A:
FIGS. 5(a)-5(c) are images used to illustrate object layout generation techniques according to an exemplary embodiment of the present invention.
Figure 5B:
Figure 5C:
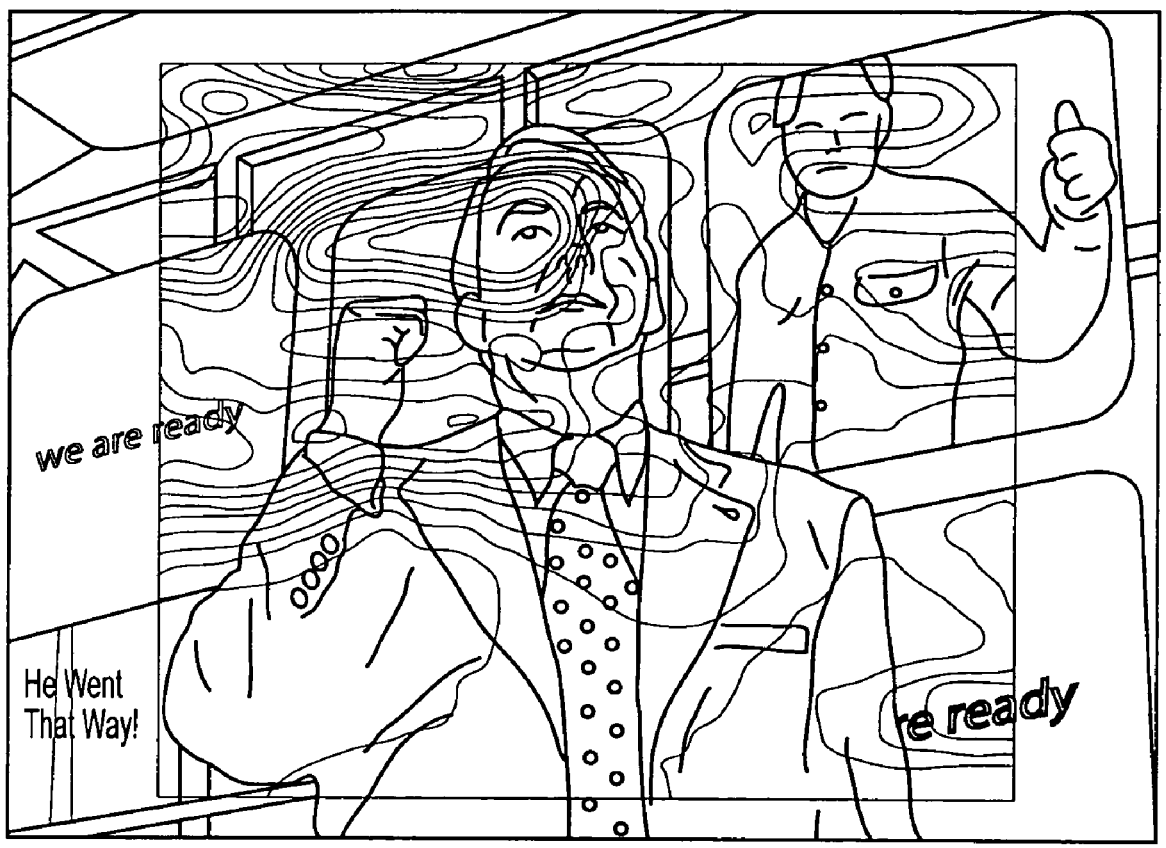

FIGS. 5(a)-5(c) depict a result of image processing in accordance with an exemplary embodiment of the present invention. FIG. 5(a) illustrates a background image into which a text string object is to be placed. Although it will not be as apparent from the black-and-white rendition in the patent drawing, this exemplary background image is complex in the sense that it contains areas of high contrast, high salience (e.g., faces) and high sharpness. In this example, the layout generation function 208 operates to determine a position within the background image of FIG. 5(a) to insert the text string "Good Job". FIG. 5(b) illustrates the background image of FIG. 5(a) overlaid by a topological depiction of the output of the cost function (2), referred to herein as a "cost function map". Note that the cost function map does not extend all the way to the edges of the background image in FIG. 5(b). This occurs because the (x,y) positions used to compute the cost function values are associated with a center of the bounding box in this exemplary embodiment. Accordingly, since the potential placement positions only include those positions wherein the entire bounding box is within the background image, (x,y) values near the edge of the background image are invalid.

Although not easy to discern in the black-and-white FIG. 5(b), the contour lines in the cost function map identify regions having homogenous cost values. For example, high cost regions are identified in the cost function map over the faces in FIG. 5(b) and over the text already present in the background image, i.e., the text string "we are ready". Low cost regions, on the other hand, are identified in, for example, the bottom left and bottom right portions of the background image. For the text string object "Good Job", the layout generation function 208 selected the bottom right-hand corner of the background image as the placement position for the object and inserted it there as shown.

If, on the other hand, a different object was to be inserted into the background image of FIG. 5(a), then the output of the cost function analysis unit 440 will be different than that shown in FIG. 5(b) and the object position selection result may change. For example, consider that a larger text string, e.g., "He Went That Way!", is designated as an object to be inserted into the background image of FIG. 5(a). The bounding box for this text string is larger than the bounding box for the text string in the first example. This results in changes to the values computed by the cost function analysis unit 440 as shown, e.g., by the cost function map illustrated in FIG. 5(c). Note, for example, the variance in the contour lines between the cost function map of FIG. 5(b) and the cost function map of FIG. 5(c) in the region of the background image containing the word "ready". This variance reflects the increase in cost associated with positioning the larger object in the lower right-hand corner of the background image, since such a placement would result in the object obscuring the background text. Thus, the layout generation function 208 selected, in this example, a position in the lower left-hand as the placement position for the text string "He Went That Way!".

The present invention can be implemented in a number of different ways including that described in the foregoing exemplary embodiments. For example, instead using a multiplicative cost function as set forth in equation (2), the weighting factors can be additively combined. More or fewer variables can be used in the cost function. As another alternative, the variables to be used in determining the placement position of an object in a background image can be provided to a multilayer neural net, the parameters of which can be trained on images which have been laid out manually by a graphic artist. Similarly, the weights k, m, and n can be determined by training the system using a number of objects and background images.

According to another exemplary embodiment of the present invention, rather than calculating a cost function for each position within the background image, the cost function analysis unit 440 can instead calculate a cost for each image segment in turn and then determine if it is possible to place the object entirely within the image segment having the lowest cost. If the object is too large to fit within the lowest cost segment, then the cost function analysis unit 440 can merge neighboring low cost image segments until the desired size is achieved As described above, some exemplary embodiments of the present invention operate to find an optimal position for object placement by evaluating all possible positions within the background image. However, other exemplary embodiments of the present invention provide for reduced computation time by reducing the number of potential placement positions for which a cost function is computed. For example, instead of testing every possible pixel within the background image, a coarser test grid which tests every Nth pixel (e.g., every $10^{th}$ pixel) can be used.

Figure 6A:
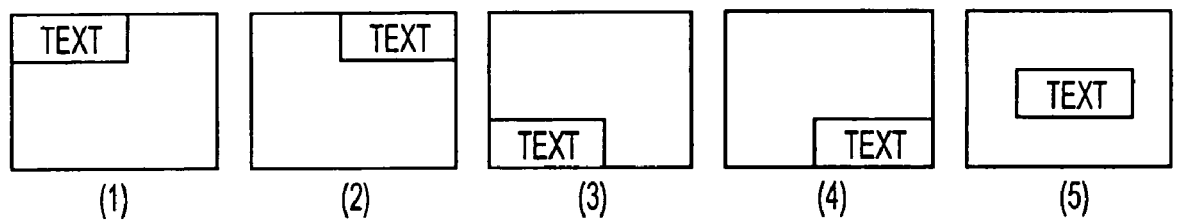
FIGS. 6(a) and 6(b) illustrate test positions and object placement according to another exemplary embodiment of the present invention.

Yet another way to reduce computation time is to test an even smaller subset of positions within the background image by, for example, having several predetermined positions within the background image which will be tested. An example is shown in FIG. 6(a), wherein five predetermined test positions for an object, in this example a text string, are illustrated. As in the previous exemplary embodiment, each potential placement position for the object can be scored for example using the equation:

$$S_i(C) = w_A A_i(C) + w_P P_i(C) + w_B B_i(C) \quad (3)$$

wherein C is the object identifier, i is the position index, A, P and B represent scores based on aesthetics, customer preferences and business needs, respectively, and w is the weight assigned to each of the factors A, P and B. In this context, the aesthetics factor A reflects how the layout appears using criteria such as alignment, contrast, repetition and proximity. For example, contrast alone could be used such that if the object to be placed within the background image has a low contrast at one test position (e.g., a red text object to be placed on red-hued background region) it will have a lower C value as compared to another test position where a high contrast exists (e.g., a red text object to be placed on a black-hued background region). The customer preferences factor C can be used to, for example, skew the total score in favor of test positions which have been approved previously by a particular customer. If, for example, a data mining operation shows that a particular customer has used test position (3) for a number of previous print jobs, then that position index can be assigned a higher B value than the other test positions. Alternatively, if a customer is known to send out print jobs using larger font, that fact can also be used to adjust the C value if the different test positions are able to accept different sized objects. Likewise, the business needs factor B can reflect other variations. If, for example, the length of a flyer to be printed is limited to one page, but a particular test position requires the flyer to be to pages, then that test position could be assigned a negative B value. In this example, the test position having the maximum score would then be selected as the position for inserting the object.

Figure 6B:
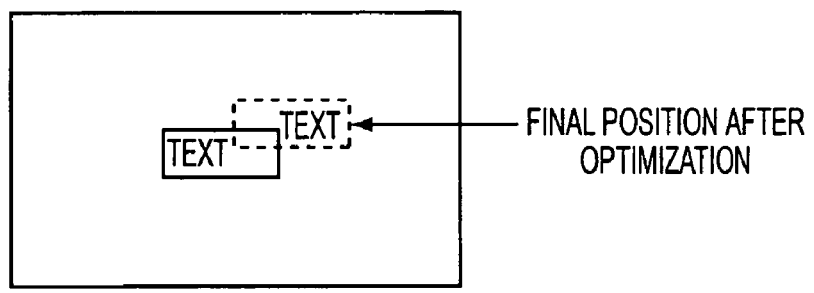

An optional step of local optimization can be added as illustrated in FIG. 6(b). After one of the predetermined number of test positions has been selected as described above with respect to FIG. 6(a), a second-pass algorithm can further evaluate additional test positions within some predetermined distance of the selected position to determine if a better placement position is available. This can be done by, for example, combining the two previously described embodiments. For example, a first one of N (e.g., 5) positions can be selected using a first-pass position evaluation algorithm, e.g., equation (3). Then, all pixels (or every Ith pixel) within M pixels of the first selected position can be evaluated using a second-pass position evaluation algorithm, e.g., equation (2). If one of the pixels within the second-pass test region receives a better score than the pixel selected during the first-pass, then the second-pass (locally optimized) position can be selected for placement of the object instead of using the first-pass placement decision. Alternatively, the same position evaluation algorithm can be used for both the first pass and the second pass.

Systems and methods for image processing according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. Various alternatives are also contemplated by exemplary embodiments of the present invention.

For example, other computation speed enhancements can be included by, e.g., reducing the granularity of the sharpness function 430, abstaining from calculating sharpness for image segments having a saliency score above a predetermined threshold, etc. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method, comprising
operating a computer processor to perform operations comprising:
   ascertaining a respective score for each of multiple positions of a graphic object in a background image, wherein the ascertaining of each of the scores comprises evaluating a function that depends on characteristics of the graphic object and characteristics of the background image and provides a quantitative assessment of a placement of the graphic object at the respective position in the background image, the ascertaining comprises determining values of color contrast between the graphic object and the background image, and the ascertaining further comprises determining the scores from the determined color contrast values;
   selecting one of the positions based on the scores; and
   producing an output image, wherein the producing comprises superimposing the graphic object on the background image at the selected position.

2. The method of claim 1, wherein the graphic object is a text string.

3. The method of claim 1, wherein the function depends on a measure of contrast between the graphic object and the background image.

4. The method of claim 1, wherein the function depends on at least one of a measure of contrast between the graphic object and the background image, a measure of saliency of the background image at each respective position, and a measure of sharpness of the background image at each respective position.

5. The method of claim 1, wherein the positions include all positions within the background image that permit the graphic object to be displayed within boundaries of the background image.

6. The method of claim 1, wherein the positions include only a subset of all positions within the background image that permit the graphic object to be displayed within boundaries of the background image.

7. The method of claim 6, wherein the subset of all positions includes a set of predetermined positions.

8. The method of claim 1, further comprising the steps of:
   segmenting the background image into image segments; and
   determining respective features of each of the image segments;
   wherein the ascertaining comprises ascertaining a respective one of the scores for each of the image segments based on a function that depends on the respective features of the segment.

9. The method of claim 1, wherein the function is a cost function Cost (x,y) that is defined by:

$$\text{Cost}(x, y) = \sum \text{all segments}(sharpness^n * saliency^m * F_{segment}/constrast^k)$$

where:
(x,y) are placement coordinates within the background image currently being evaluated as a candidate for placement of the object, sharpness is a value of sharpness of the background image at position (x,y), saliency is a value of saliency of the background image at position (x,y), contrast is a value of contrast between the background image and the object, $F_{segment}$ is a fraction of a background image segment obscured by the object when it is placed at position (x,y), and n, m and k are constant.

10. The method of claim 1, wherein the function is a scoring function $S_i(C)$ that is defined by:

$$S_i(C) = w_A A_i(C) + w_P P_i(C) + w_B B_i(C)$$

wherein C is an object identifier, i is a position index, A, P and B represent scores based on aesthetics, customer preferences and business needs, respectively, and $w_A$, $w_B$, and $w_C$ are weights assigned to each of the factors A, P and B.

11. A computer-readable medium storing computer-readable instructions that, when executed by a computer, cause the computer to perform operations comprising:
   ascertaining a respective score for each of multiple positions of a graphic object in a background image, wherein the ascertaining of each of the scores comprises evaluating a function that depends on characteristics of the graphic object and characteristics of the background image and provides a quantitative assessment of a placement of the graphic object at the respective position in the background image, the ascertaining comprises determining values of color contrast between the graphic object and the background image, and the ascertaining further comprises determining the scores from the determined color contrast values;
   selecting one of the positions based on application of an optimization criteria on the scores; and
   producing an output image, wherein the producing comprises superimposing the graphic object on the background image at the selected position.

12. The computer-readable medium of claim 11, wherein the graphic object is a text string.

13. The computer-readable medium of claim 11, wherein the function depends on a measure of contrast between the graphic object and the background image.

14. The computer-readable medium of claim 11, wherein the function depends on at least one of a measure of contrast between the graphic object and the background image, a measure of saliency of the background image at each respective position, and a measure of sharpness of the background image at each respective position.

15. The computer-readable medium of claim 11, wherein the positions include all positions within the background image that permit the graphic object to be displayed within boundaries of the background image.

16. The computer-readable medium of claim 11, wherein the positions include only a subset of all positions within the background image that permit the graphic object to be displayed within boundaries of the background image.

17. The computer-readable medium of claim 16, wherein the subset of all positions includes a set of predetermined positions.

18. The computer-readable medium of claim 11, wherein, when executed by the computer, the instructions cause the computer to perform operations comprising:
   segmenting the background image into image segments; and
   determining respective features of each of the image segments;
   wherein the ascertaining comprises ascertaining a respective one of the scores for each of the image segments based on a function that depends on the respective features of the segment.

19. The computer-readable medium of claim 11, wherein the function is a cost function Cost(x,y) that is defined by:

$$\text{Cost}(x, y) = \sum \text{all segments}(sharpness^n * saliency^m * F_{segment}/constrast^k)$$

where:
   (x,y) are placement coordinates within the background image currently being evaluated as a candidate for placement of the object, sharpness is a value of sharpness of the background image at position (x,y), saliency is a value of saliency of the background image at position (x,y), contrast is a value of contrast between the background image and the object, $F_{segment}$ is a fraction of a background image segment obscured by the object when it is placed at position (x,y), and n, m and k are constants.

20. The computer-readable medium of claim 11, wherein the function is a scoring function Si(C) that is defined by:

$$S_i(C) = w_A A_i(C) + w_P P_i(C) + w_B B_i(C)$$

wherein C is an object identifier, i is a position index, A, P and B represent scores based on aesthetics, customer preferences and business needs, respectively, and $w_A$, $w_B$, and $w_C$ are weights assigned to each of the factors A, P and B.

21. An image processing system comprising:
   a computer-readable medium storing computer-readable instructions; and
   a computer processor coupled to the computer-readable medium, operable to execute the instructions, and based at least in part on the execution of the instructions operable to perform operations comprising
      ascertaining a respective score for each of multiple positions of a graphic object in a background image, wherein the ascertaining of each of the scores comprises evaluating a function that depends on characteristics of the graphic object and characteristics of the background image and provides a quantitative assessment of a placement of the graphic object at the respective position in the background image, the ascertaining comprises determining values of color contrast between the graphic object and the background image, and the ascertaining further comprises determining the scores from the determined color contrast values
      selecting one of the positions based on the scores, and
      producing an output image, wherein the producing comprises superimposing the graphic object on the background image at the selected position.

22. The image processing system of claim 21, wherein the graphic object is a text string.

23. The image processing system of claim 21, wherein the function depends on a measure of contrast between the graphic object and the background image.

24. The image processing system of claim 21, wherein the function depends on at least one of a measure of contrast between the graphic object and the background image, a measure of saliency of the background image at each respective position, and a measure of sharpness of the background image at each respective position.

25. The image processing system of claim 21, wherein the positions include all positions within the background image that permit the graphic object to be displayed within boundaries of the background image.

26. The image processing system of claim 21, wherein the positions include only a subset of all positions within the background image that permit the graphic object to be displayed within boundaries of the background image.

27. The image processing system of claim 26, wherein the subset of all positions includes a set of predetermined positions.

28. The image processing system of claim 21, wherein based at least in part on the execution of the instructions the processor is operable to perform operations comprising
   segmenting the background image into image segments, and
   determining respective features of each of the image segments;
   wherein in the ascertaining the processor is operable to perform operations comprising ascertaining a respective one of the scores for each of the image segments based on a function that depends on the respective features of the segment.

29. The image processing system of claim 23, wherein the function is a cost function Cost(x,y) that is defined by:

$$\text{Cost}(x, y) = \sum \text{all segments}(sharpness^n * saliency^m * F_{segment}/constrast^k)$$

where:
   (x,y) are placement coordinates within the background image currently being evaluated as a candidate for placement of the object, sharpness is a value of sharpness of the background image at position (x,y), saliency is a value of saliency of the background image at position (x,y), contrast is a value of contrast between the background image and the object, $F_{segment}$ is a fraction of a background image segment obscured by the object when it is placed at position (x,y), and n, m and k are constants which are used to vary a relative weighting between sharpness, saliency and contrast.

30. The image processing system of claim 23, wherein the function is a scoring fraction $S_i(C)$ that is defined by:

$$S_i(C) = w_A A_i(C) + w_P P_i(C) + w_B B_i(C)$$

wherein C is an object identifier, i is a position index, A, P and B represent scores based on aesthetics, customer preferences and business needs, respectively, and $w_A$, $w_B$, and $w_C$ are weights assigned to each of the factors A, P and B.

31. An image processing system, comprising computer processor means for:
   ascertaining a respective score for each of multiple positions of a graphic object in a background image, wherein the ascertaining of each of the scores comprises evaluating a function that depends on characteristics of the graphic object and characteristics of the background image and provides a quantitative assessment of a placement of the graphic object at the respective position in the background image, the ascertaining comprises determining values of color contrast between the graphic object and the background image, and the ascertaining further comprises determining the scores from the determined color contrast values;

selecting one of the positions based on the scores; and superimposing the graphic object on the background image at the selected position in a process of producing an output image.

* * * * *

UNITED STATES PATENT AND TRADEMARK OFFICE
CERTIFICATE OF CORRECTION

PATENT NO. : 7,609,847 B2
APPLICATION NO. : 10/995686
DATED : October 27, 2009
INVENTOR(S) : Simon Widdowson et al.

It is certified that error appears in the above-identified patent and that said Letters Patent is hereby corrected as shown below:

In column 4, line 11, delete "$\Sigma \text{all segments (sharpness}^n * \text{saliency}^m * F_{segment}/\text{constrast}^k)$" and insert -- $\Sigma_{\text{all segments}} (\text{sharpness}^n * \text{saliency}^m * F_{segment}/\text{constrast}^k)$ --, therefor.

In column 7, line 17, in Claim 1, after "comprising" insert -- : --.

In column 8, line 5, in Claim 9, delete "$\text{Cost}(x, y) = \Sigma \text{all segments (sharpness}^n * \text{saliency}^m * F_{segment}/\text{constrast}^k)$" and insert -- $\text{Cost}(x,y) = \Sigma_{\text{all segments}} (\text{sharpness}^n * \text{saliency}^m * F_{segment}/\text{constrast}^k)$ --, therefor.

In column 9, line 16, in Claim 19, delete "$\text{Cost}(x, y) = \Sigma \text{all segments (sharpness}^n * \text{saliency}^m * F_{segment}/\text{constrast}^k)$" and insert -- $\text{Cost}(x,y) = \Sigma_{\text{all segments}} (\text{sharpness}^n * \text{saliency}^m * F_{segment}/\text{constrast}^k)$ --, therefor.

In column 9, line 56, in Claim 21, after "comprising" insert -- : --.

In column 9, line 56, in Claim 21, after "values" insert -- , --.

In column 10, line 20, in Claim 28, after "comprising" insert -- : --.

In column 10, line 36, in Claim 29, delete "$\text{Cost}(x, y) = \Sigma \text{all segments (sharpness}^n * \text{saliency}^m * F_{segment}/\text{constrast}^k)$" and insert -- $\text{Cost}(x,y) = \Sigma_{\text{all segments}} (\text{sharpness}^n * \text{saliency}^m * F_{segment}/\text{constrast}^k)$ --, therefor.

Signed and Sealed this

Sixth Day of July, 2010

David J. Kappos
*Director of the United States Patent and Trademark Office*